(12) United States Patent
Halpern

(10) Patent No.: US 9,246,939 B2
(45) Date of Patent: Jan. 26, 2016

(54) PREVENTING NEIGHBOR-DISCOVERY BASED DENIAL OF SERVICE ATTACKS

(75) Inventor: Joel Halpern, Leesburg, VA (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 820 days.

(21) Appl. No.: 13/165,348

(22) Filed: Jun. 21, 2011

(65) Prior Publication Data

US 2012/0331542 A1 Dec. 27, 2012

(51) Int. Cl.
*G06F 12/14* (2006.01)
*H04L 29/06* (2006.01)

(52) U.S. Cl.
CPC .................. *H04L 63/1458* (2013.01)

(58) Field of Classification Search
None
See application file for complete search history.

(56) References Cited

U.S. PATENT DOCUMENTS

| | | | | |
|---|---|---|---|---|
| 2006/0072574 | A1* | 4/2006 | Akahane et al. | 370/392 |
| 2007/0147313 | A1* | 6/2007 | Braam et al. | 370/338 |
| 2007/0280135 | A1* | 12/2007 | Syed et al. | 370/254 |
| 2008/0240106 | A1* | 10/2008 | Schlenk | 370/392 |

OTHER PUBLICATIONS

G. An and J. Nah, Effective Control of Abnormal Neighbor Discovery Congestion on IPv6 Local Area Network, Ubiquitous Intelligence and Computing_vol. 4159, 2006, pp. 966-976.*
P. P Mutaf and C. Castelluccia, Compact neighbor discovery: A bandwidth defense through bandwidth optimization, INFOCOM 2005, Mar. 2005 vol. 2.*
B. Sarikaya and F. Xia, Lightweight Secure Neighbor Discovery for Low-power and Lossy Networks, Network Working Group B. Sarikaya Internet-Draft, Oct. 4, 2010.*
T. Narten, E. Nordmark, W. Simpson, and H. Soliman, Neighbor Discovery for IP version 6 (IPv6), RFC 2461, Sep. 2007.*
Crawford M., Transmission of IPv6 Packets over Ethernet Networks, RFC 2464, Dec. 1998 (attached to the instant office action as rfc2464__EUI-64.pdf).*
Cisco IOS IPv6 Command Reference, section debug ipv6 nd, Jul. 2011 (attached to the instant office action as ipv6__book__part.pdf).*
Hinden, R. and Deering, S., IP Version 6 Addressing Architecture, Network Working Group RCE 4291, Feb. 2006.*
An, G. , et al., "Effective Control of Abnormal Neighbor Discovery Congestion on IPv6 Local Area Network", Jan. 1, 2006, Ubiquitous Intelligence and Computing: Third International Conference UIC 2006, Wuhan, China Sep. 3-6, 2006; Proceedings; [Lecture Notes in Computer Science; 4159] Springer, Berlin DE.

(Continued)

*Primary Examiner* — Kaveh Abrishamkar
(74) *Attorney, Agent, or Firm* — Nicholson De Vos Webster & Elliott, LLP

(57) ABSTRACT

A method is provided for preventing denial-of-service attacks on hosts attached to a subnet, where the attacks are initiated by a remote node over an external network. The method is performed by a router which forwards packets between the external network and the subnet. The router receives a packet for forwarding to a destination address in an address space of the subnet according to the IPv6 protocol and looks up the destination address in a Neighbor Discovery (ND) table. The ND table is populated by operations on the subnet that were completed prior to receipt of the packet. Entries in the ND table store address information of the hosts that have been verified by the router to be active. The router forwards the packet to the destination address if the destination address is stored in the ND table. Otherwise, the packet is discarded.

14 Claims, 7 Drawing Sheets

(56) References Cited

OTHER PUBLICATIONS

Mutaf, P., et al., "Compact neighbor discovery (a bandwidth defense through bandwidth optimization". *INFOCOM 2005. 24th Annual Joint Conference of the IEEE Computer and Communications Societies. Proceedings IEEE Miami, FL, USA Mar. 13-17, 2005, Piscataway, NJ, USA,IEEE, Piscataway, NJ, USA, vol. 4*. Mar. 13, 2005.

Nikander, P., et al., "IPv6 Neighbor Discovery (ND) Trust Models and Threats", rfc3756.txt May 1, 2004.

Conta, A., et al., "Internet Control Message Protocol (ICMPv6) for the Internet Protocol Version 6 (IPv6)", Network Working Group, Standards Track, RFC 4443, Mar. 2006, pp. 1-22.

Deering, S., et al., "Internet Protocol Version 6 (IPv6)", Network Working Group, Standards Track, RFC 2460, Dec. 1998, pp. 1-35.

Narten, T., et al., "Neighbor Discovery for IP version 6 (IPv6)", Network Working Group. Standards Track, RFC 4861, Sep. 2007, pp. 1-87.

* cited by examiner

PREVENTING NEIGHBOR-DISCOVERY BASED DENIAL OF SERVICE ATTACKS

FIELD OF THE INVENTION

Embodiments of the invention relate to a method and system for preventing denial of service attacks, where the attacks are based on the Neighbor Discovery protocol of the Internet Protocol version 6 (IPv6).

BACKGROUND

The Internet Protocol version 6 (IPv6) is designed to address the issue of address exhaustion in Internet Protocol version 4 (IPv4). In conjunction with expanding the address space from 32 bits to 128 bits, IPv6 introduces a number of changes. For example, IPv6 increases the number of bits that is used to number the hosts in a subnet, and moves from a media-based Address resolution Protocol (ARP) to an IP-based Neighbor Discovery protocol. IPv6 subnets are defined by the standards to have at least 64 bits for numbering the hosts, where before a subnet might have 6 to 12 bits for numbering the hosts.

Operators and security analysts have noticed a problematic effect of the new larger subnets. The numbering space for a subnet is now 16 quintillion entries. Clearly, no subnet will use any noticeable fraction of these entries.

One problem with the larger subnet is that a remote attacker could send a series of packets to a subnet, addressed to different randomly chosen potential hosts. In the current practice, this would cause the border router to send into the subnet a stream of neighbor discovery packets, and to create cache entries for this information. As the table space in the router is limited, this attack can easily overrun the available table space, and cause the router to lose track of actual hosts, and to prevent new legitimate hosts from registering.

There are existing techniques that remediate this attack in certain scenarios, such as when the subnet is a subscriber subnet using Point-to-Point Protocol over Ethernet (PPPoE). However, there is no general prophylactic approach for preventing the attack.

SUMMARY

A method is provided to prevent denial-of-service attacks on hosts attached to a subnet, where the attacks are initiated by a remote node over an external network. The method is performed by a router which forwards packets between the external network and the subnet. The method comprises: receiving, by the router, a packet for forwarding to a destination address in an address space of the subnet according to the IPv6 protocol and looking up the destination address in a neighbor discovery (ND) table maintained by the router. The ND table is populated by operations on the subnet that were completed prior to receipt of the packet. The ND table contains entries with each entry storing address information of one of the hosts that have been verified by the router to be active. The method further comprises: forwarding the packet to the destination address in response to a determination that the destination address is stored in the ND table; and discarding the packet in response to a determination that the destination address is not stored in the ND table.

A network element is provided to prevent denial-of-service attacks on hosts attached to a subnet, where the attacks are initiated by a remote node over an external network. The network element is configured to forward packets between the external network and the subnet. The network element comprises: a memory to store a neighbor discovery (ND) table, the ND table to contain entries and each entry to store address information of one of the hosts that have been verified by the network element to be active; a network processor communicatively coupled to the memory, the network processor configured to execute a destination determination module and a forwarding module. The destination determination module is configured to look up a destination address of a packet received by the network element in the ND table populated by operations on the subnet that were completed prior to receipt of the packet, wherein the destination address is in an address space of the subnet according to the IPv6 protocol. The forwarding module is configured to forward the packet to the destination address if the destination address is stored in the ND table, and discard the packet if the destination address is not stored in the ND table.

BRIEF DESCRIPTION OF THE DRAWINGS

The preset invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the present invention provide a method and system that avoids the disadvantages of the prior art. As described above, the prior art cannot effectively prevent denial of service attacks that are based on the Neighbor Discovery protocol of the IPv6. The embodiments of the invention overcome these disadvantages of the prior art by providing an attack prevention technique and related behavioral changes that are needed to keep information accurate in the network elements (e.g., one or more routers).

Figure 1:
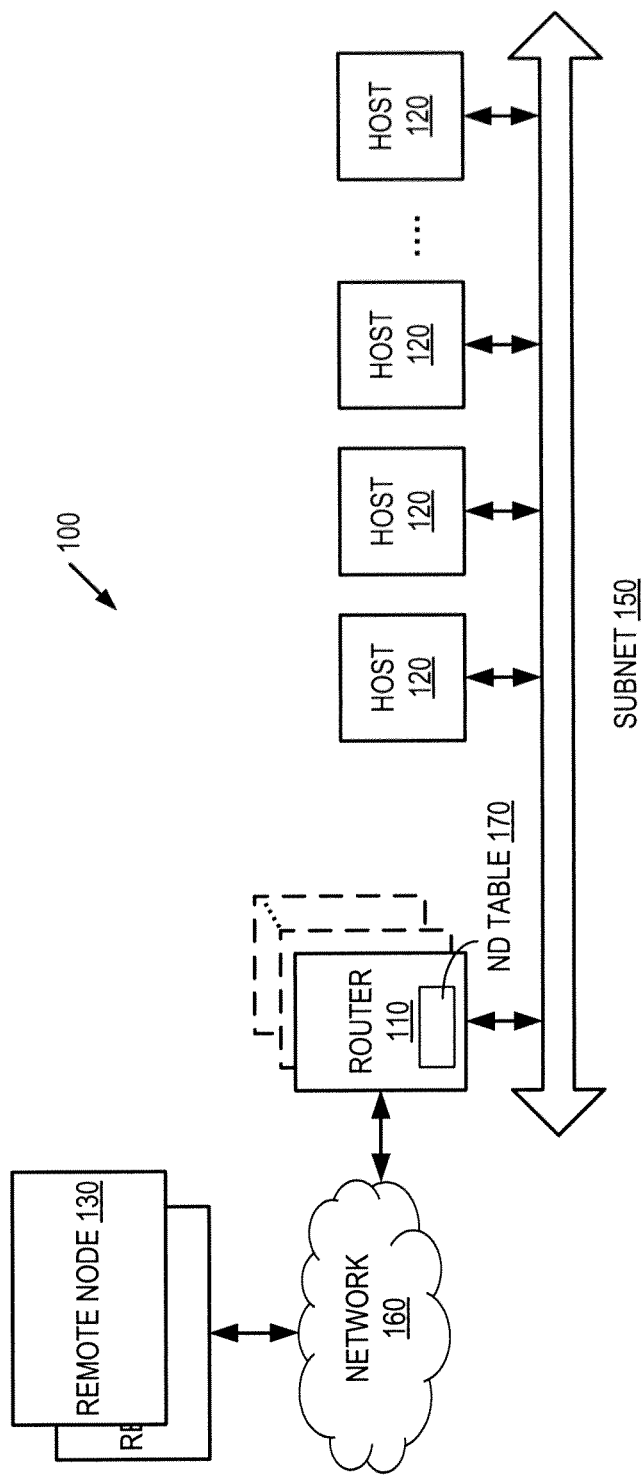
FIG. 1 is a block diagram illustrating one embodiment of a network configuration.

FIG. 1 is a block diagram illustrating one embodiment of a network configuration 100. In this embodiment, the network configuration 100 includes, but is not limited to, a subnet 150 (e.g., a local area network (LAN)) attached to a network 160 via one or more routers (e.g., a router 110). A number of hosts 120 are attached to the subnet 150 and have Internet Protocol (IP) addresses on the subnet 150. Each host 120 can be a server, a personal computer, a laptop device, a game console, a portable device, an appliance, or any device or component that can transmit and/or receive data over the network 160. The router 110 stores a data structure (referred to as a Neighbor Discovery (ND) table 170) that maps, for each subnet attached to the router 110, the on-subnet IP address of a host to the Media Access Control (MAC) address of that host.

The network configuration 100 also includes a number of remote network nodes ("remote nodes") 130 that access the hosts 120 via the router 110. In some scenarios, one of the remote nodes 130 may initiate an attack on the hosts 120. The attack can include sending large numbers of messages to different addresses allocated to the subnet 150. With the large number of possible addresses values (e.g., 16 quintillion values), it is very likely that a randomly-chosen address value does not actually name any of the hosts 120. When a packet with such a randomly-chosen address is received by the router 110 and that address is not recorded in the ND table 170, a conventional router would send a Neighbor Solicitation message onto the subnet 150 and creates a pending entry in the ND table 170, indicating (e.g., with a flag) that the entry is to be filled in after the destination host replies. However, none of the hosts 120 have the address specified in the packet and, therefore, no reply will be received from the destination host. As such, a stream of such packets that are sent within a short time will overflow the ND table 170 such that the router 110 cannot respond to legitimate requests of the hosts 120. If the attacker pursues the attack for a long enough period of time, this attack can prevent the hosts 120 on the subnet 150 from being reachable.

According to embodiments of the invention, when a packet is received from outside of a locally attached subnet, the router 110 checks whether the destination address (specifically, the destination host) is already known. A host is known to the router 110 if it has a corresponding entry in the ND table 170. If the host is not already known to the router 110, the router 110 discards the packet. As a result, the ND table 170 will not be filled by the attacks.

In some embodiments, the ND table 170 can be filled from messages/packets sent by the hosts 120 on the subnet 150. In some embodiments, the ND table 170 can store static entries that are created without the hosts 120 sending any messages/packets. These messages/packets are sent by the hosts 120 either in an unsolicited fashion, or in response to queries either from other hosts 120 on the subnet 150 or from the router 110. Entries in the ND table 170 have lifetimes, and are removed when they time out.

According to embodiments of the invention, when entries of the ND table 170 are near expiration, the router 110 will re-verify them. This re-verification is necessary for the primary mechanism (of dropping packets) to work, because it ensures that table entries for active hosts 120 stay in the ND table 170 and will not be deleted upon expiration. Thus, the router 110 can rely on the ND table 170 to filter out incoming packets that are likely from attackers. As a result, remote attackers cannot fill the subnet 150 with Neighbor Solicitation messages, nor fill the ND table 170 with pending entries, which the attacker intends to use to prevent valid entries from being created and used.

The ND table 170 can be implemented in various ways (using the full 128 bit address, or only the lower 64 bits; using hash tables, ternary content addressable memory (TCAM), binary trees (btrees), or other lookup structures). Embodiments of the invention can be applied to all such constructs, and the differences between these implementations will be ignored in the remainder of the description.

Figure 2:
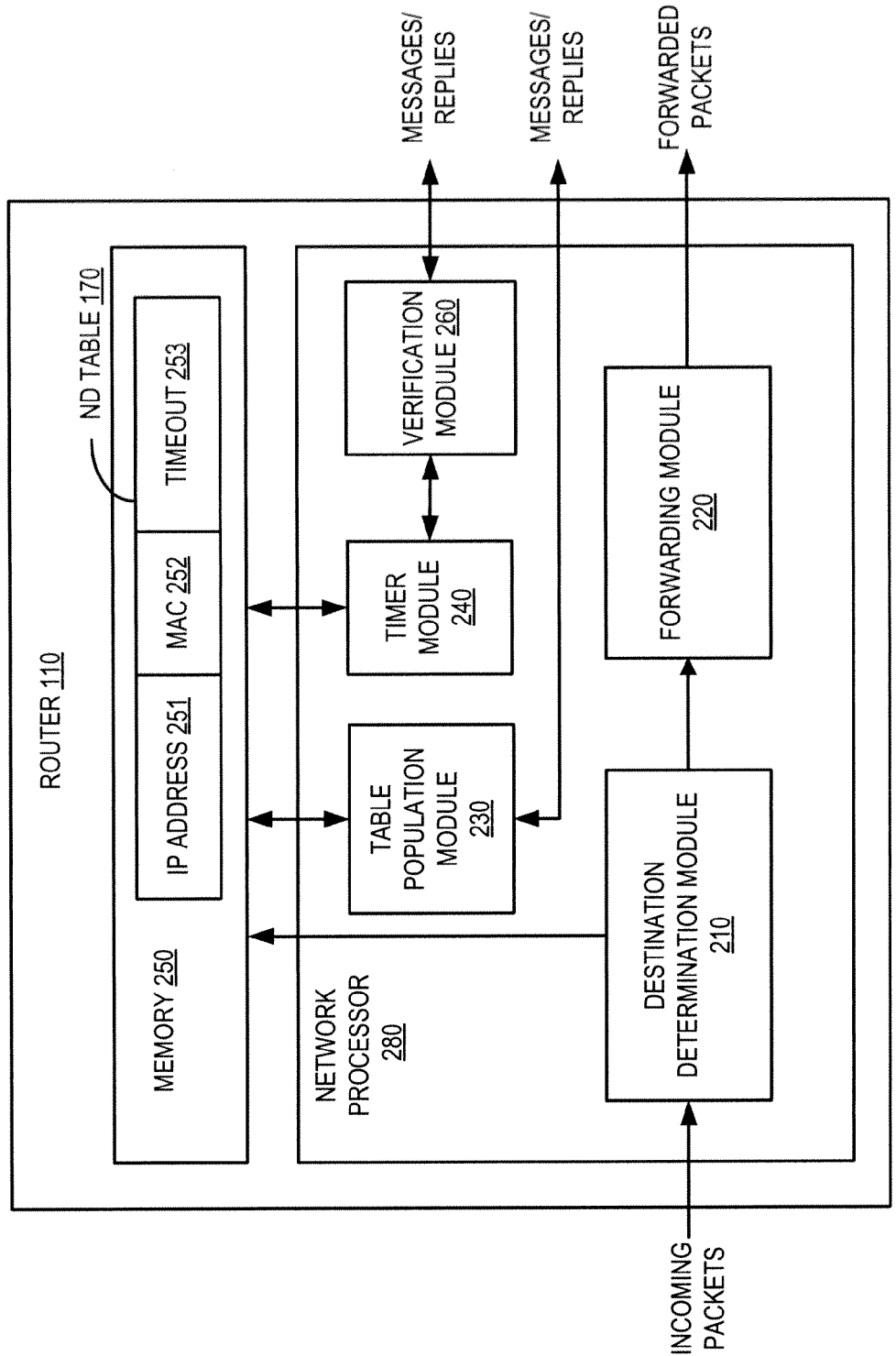
FIG. 2 is a block diagram illustrating an embodiment of a network element such as a router.

FIG. 2 is a block diagram illustrating an embodiment of a network element such as the router 110 of FIG. 1. In one embodiment, the router 110 includes, but is not limited to, a network processor 280 coupled to a memory 250. The memory 250 stores the neighbor discovery (ND) table 170, which maps, for each subnet attached to the router 110, an on-subnet IP destination address 251 of a host to a Media Access Control (MAC) address of that host. The router 110 includes a table population module 230, which populates the ND table 170 with host address information extracted from operations on the subnet 150; e.g., from packets sent by the hosts 120 in an unsolicited fashion, from packets sent by the hosts 120 in response to queries either from other hosts 120 on the subnet 150 or from the router 110.

In one embodiment, the router 110 includes a destination determination module 210 and a forwarding module 220. When an incoming packet having the IPv6 format arrives at the router 110 for forwarding into the subnet 150, the destination module 210 looks up the ND table 170 for the destination address specified in the packet. If the destination determination module 210 cannot find an entry in the ND table 170 that has the destination address, it simply drops the packet. No pending entry is created for this packet in the ND table 170.

In one embodiment, when the router 110 drops a packet, it can either send back a notification to the source or, alternatively, since these packets are usually attack messages, the router 110 can either send no responses or send the responses at a limited rate.

Embodiments of the invention ensure that the ND table 170 record correct information of all active hosts 120 on the subnet 120. This means that the table 170 should not be filled with old, probably false, information. In one embodiment, the router 110 includes a timer module 240 and a verification module 260, which are responsible for maintaining correct information of all active hosts 120 in the ND table 170. The timer module 240 detects entries in the ND table 170 that are approaching its lifetime threshold. An entry expires when its elapsed lifetime reaches the lifetime threshold. In one embodiment, the elapsed lifetime of an entry is measured from the time the entry is added to the ND table 170 (if the entry is not yet in the ND table 170). In one embodiment, after an entry is added to the ND table 170, its elapsed lifetime can be reset upon receipt of any data traffic from the host 120 identified in the entry. In another embodiment, after an entry is added to the ND table 170, its elapsed lifetime can be reset upon receipt of any control traffic from the host 120 identified in the entry.

In one embodiment, the time module 240 and the verification module 260 maintain correct information of all active hosts 120 in the ND table 170 with the following operations. In order to prevent inappropriate removal of an entry when the entry expires, the timer module 240 signals the verification module 260 when the entry is approaching its lifetime threshold (that is, going to expire). In one embodiment, the timer module 240 time stamps each entry when the entry is added to the ND table 170, and (e.g., periodically) checks the elapsed lifetime of the entry to determine whether the elapsed lifetime is greater than another pre determined threshold ("verification threshold"). The verification threshold is chosen to indicate an entry identifying a host is going to expire but there is still enough time to verify the status of the host before the entry actually expires. In one embodiment, the verification threshold of an entry can be set to be two thirds of the lifetime threshold of that entry. In one embodiment, the ND table 170 contains a timeout field 253, which stores the time stamp of an entry, an indication of whether or not the entry has reached the verification threshold, and/or other time related information for the entry.

In some embodiments, upon receipt of the signal from the timer module 240 that indicates an entry has reached its verification threshold (that is, the entry is approaching expiration but has not yet expired), the verification module 260 may send a Neighbor Solicitation message destined for the entry's IP address. If the host 120 with that IP address is still valid and functioning, the host 120 will respond to the solicitation. The response from that host 120 extends the lifetime of the entry (e.g., resets the elapsed lifetime of the entry). Thus, the entry can stay in the ND table 170. If the host 120 with that IP address does not respond, the entry will be removed from the ND table 170 when it expires (i.e., when the entry reaches its lifetime threshold).

In the following description, the operations of the flow diagrams of FIGS. 3 and 4 will be described with reference to the exemplary embodiments of FIGS. 1 and 2. However, it should be understood that the operations of the flow diagrams can be performed by embodiments of the invention other than those discussed with reference to FIGS. 1 and 2, and the embodiments discussed with reference to FIGS. 1 and 2 can perform operations different than those discussed with reference to the flow diagrams of FIGS. 3 and 4.

Figure 3:
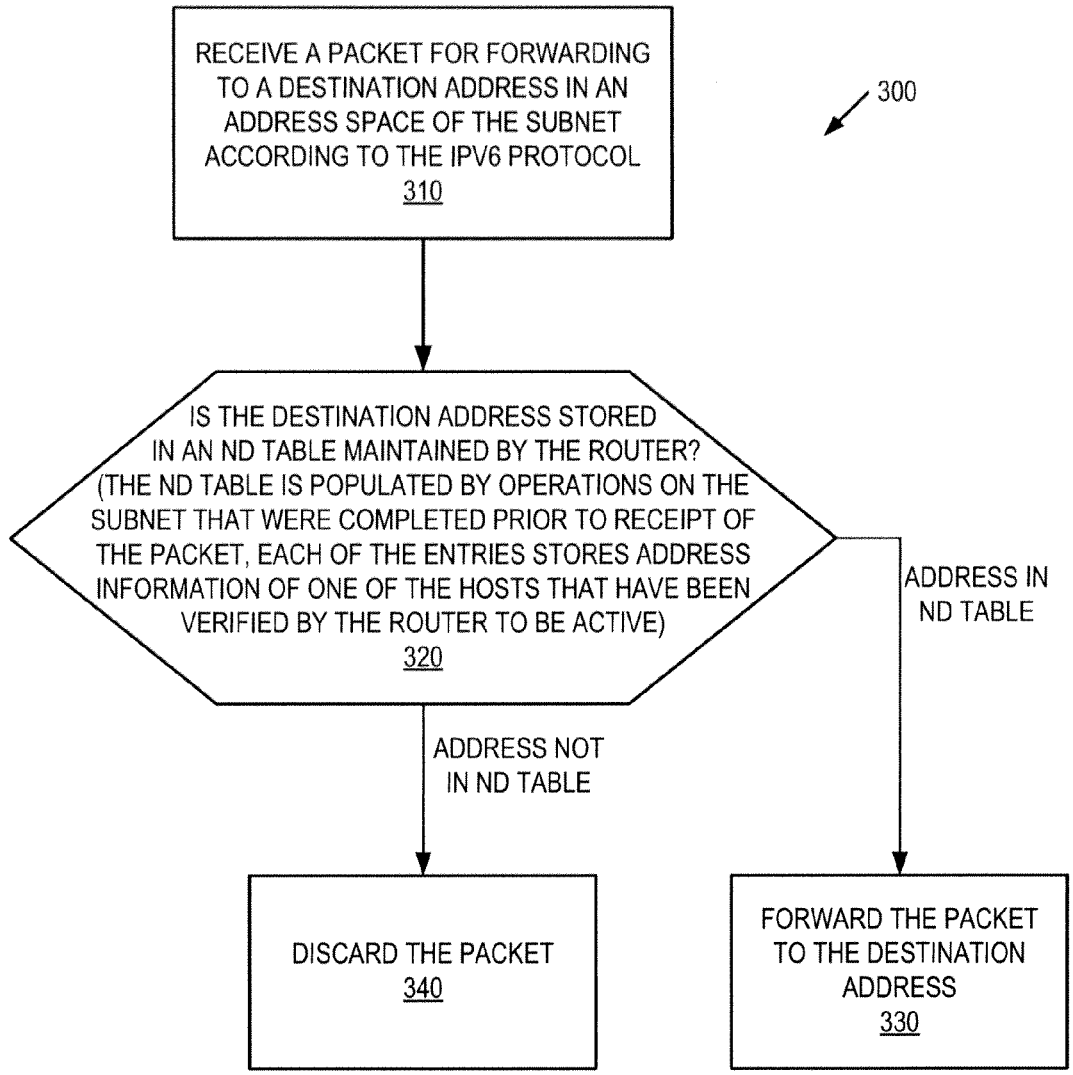
FIG. 3 is a flow diagram of one embodiment of a method performed by a router for preventing neighbor-discovery based attacks.

FIG. 3 is a flow diagram of one embodiment of a method 300 performed by the router 110 for preventing neighbor-discovery based attacks. In one embodiment, the router 110 receives a packet for forwarding to a destination address in an address space of the subnet 150 according to the IPv6 protocol (block 310). The router 110 looks up the destination address in the ND table 170 (block 320). The ND table 170 is populated by operations on the subnet 150 that were completed prior to receipt of the packet. Each entry of the ND table 170 stores address information of one of the hosts 120 that have been verified by the router 110 to be active. The router 110 forwards the packet to the destination address if the destination address is stored in the ND table 170 (block 330). The router 110 discards the packet if the destination address is not stored in the ND table 170 (block 340).

Figure 4:
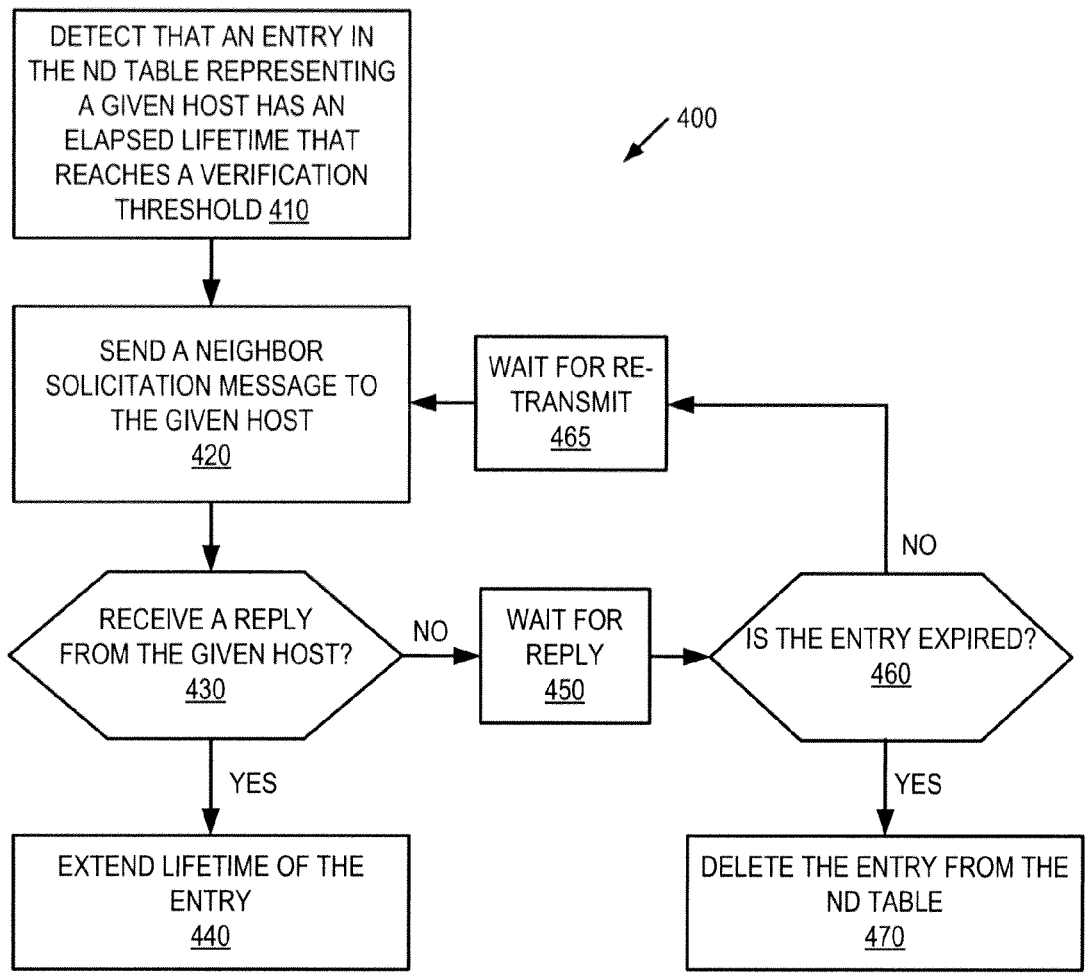
FIG. 4 is a flow diagram of one embodiment of a method performed by a router for maintaining a Neighbor Discovery table.

FIG. 4 is a flowchart of one embodiment of a method 400 performed by the router 110 for maintaining the ND table 170. In one embodiment, the router 110 detects that an entry in the ND table representing a given host has an elapsed lifetime that reaches a threshold (i.e., the verification threshold) (block 410). Upon the detection, the router 110 sends a Neighbor Solicitation message to the given host (block 420). If the router 110 receives a reply from the given host (block 430), the lifetime of the entry for that given host is extended (e.g., by extending its lifetime threshold or resetting its elapsed lifetime) (block 440). As the router 110 waits for a reply (block 450), the router 110 performs periodic checks on the elapsed lifetime of the entry to determine whether the entry has expired (i.e., reaches the lifetime threshold) (block 460). If the entry has expired, the router 110 deletes the entry from the ND table 170 (block 470). If the entry has not expired, the router 110 waits for a period of time (block 465) to re-transmit another Neighbor Solicitation message (block 420) in case the lack of response is due to errors caused by network problems. The router 110 repeats the operations of blocks 420, 430, 450, 460 and 465 until either a reply is received or the entry expires.

The above description is related to scenarios in which one router 110 provides connectivity to the subnet 150, or when all the routers 110 providing the connectivity come up at once. In the latter scenario, since all of the routers 110 come up at substantially the same time, they all see the advertisements from the hosts 120 and have correct information in their respective ND tables 170.

In another scenario when there are multiple routers (e.g., multiple routers 110 of FIG. 1), and one router comes up significantly later than the other routers (e.g., due to the router being restarted individually), then that later router will not see advertisements from the hosts 120 on the subnet 150, and will not have the information to populate its ND table. In the following description in connection with FIGS. 5-7, the router that comes up earlier is referred to as a first router 110A and the router that comes up significantly later is referred to as a second router 110B. Each of the routers 110A and 110B maintains an ND table (e.g., the ND table 170 of FIGS. 1 and 2) internally. Additionally, although one host 120 is shown, it is understood that any of the hosts 120 on the subnet 150 can perform the operations to be described below in connection with FIGS. 5-7.

Figure 5:
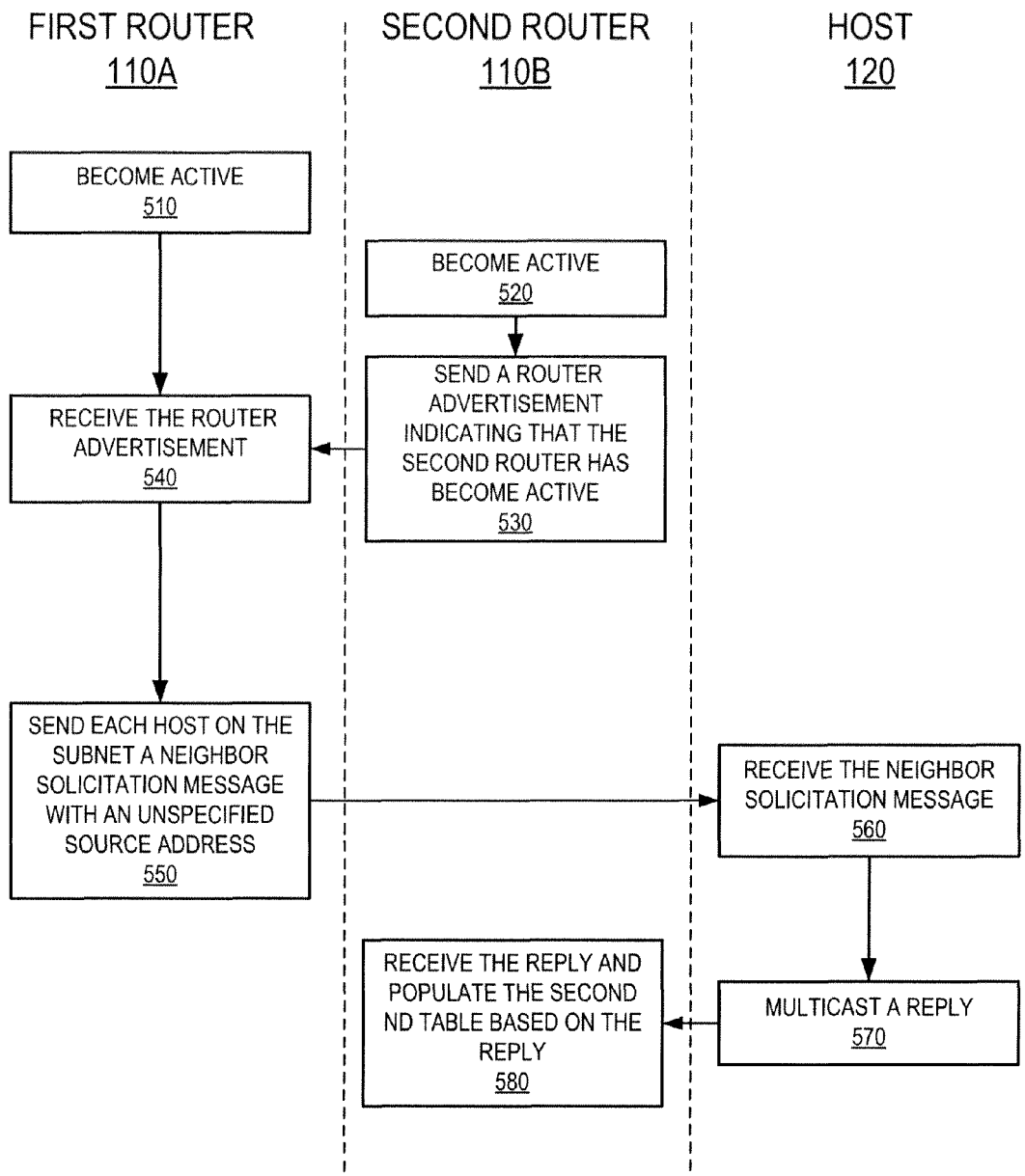
FIG. 5 is a diagram of a first embodiment of a message flow between the routers and the hosts on a subnet.

FIG. 5 is a diagram of a first embodiment of a message flow between the first router 110A, the second router 110B, and the host 120, which enables the second router 110B to obtain information for populating its ND table. In one embodiment, the first router 110A becomes active (block 510) followed by the second router 110B becoming active (block 520). The second router 110B sends out a router advertisement indicating that it has become active (block 530). The router advertisement is used to notify the first router 110A that it has a new neighbor. When the first router 110A receives the router advertisement (block 540), it sends each host 120 on the subnet 150 a Neighbor Solicitation message with an unspecified source address (block 550). When each host 120 receives the Neighbor Solicitation message (block 560), it multicasts a reply (block 570). The second router 110B receives the replies from the host 120 and populates its ND table ("second ND table") based on the replies (block 580).

Figure 6:
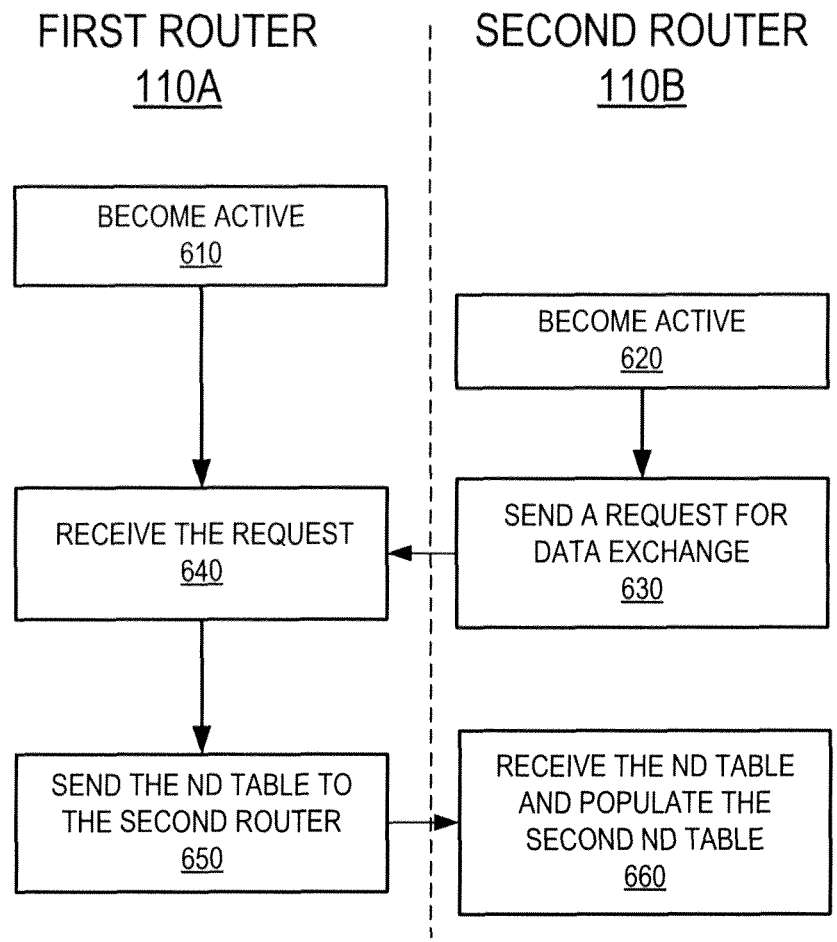
FIG. 6 is a diagram of a second embodiment of a message flow between the routers and the hosts on a subnet.

FIG. 6 is a diagram of a second embodiment of a message flow between the first router 110A, the second router 110B, and the host 120, which enables the second router 110B to obtain information for populating its ND table. In one embodiment, the first router 110A becomes active (block 610) followed by the second router 110B becoming active (block 620). The second router 110B sends a request to the first router 110A for data exchange (block 630). When the first router 110A receives the request (block 640), it sends data in its ND table using a data exchange protocol (e.g., the Server Cache Synchronization Protocol (SCSP) or other similar protocols) (block 650). The second router 110B receives the data and uses the data to populate its ND table (block 660).

Figure 7:
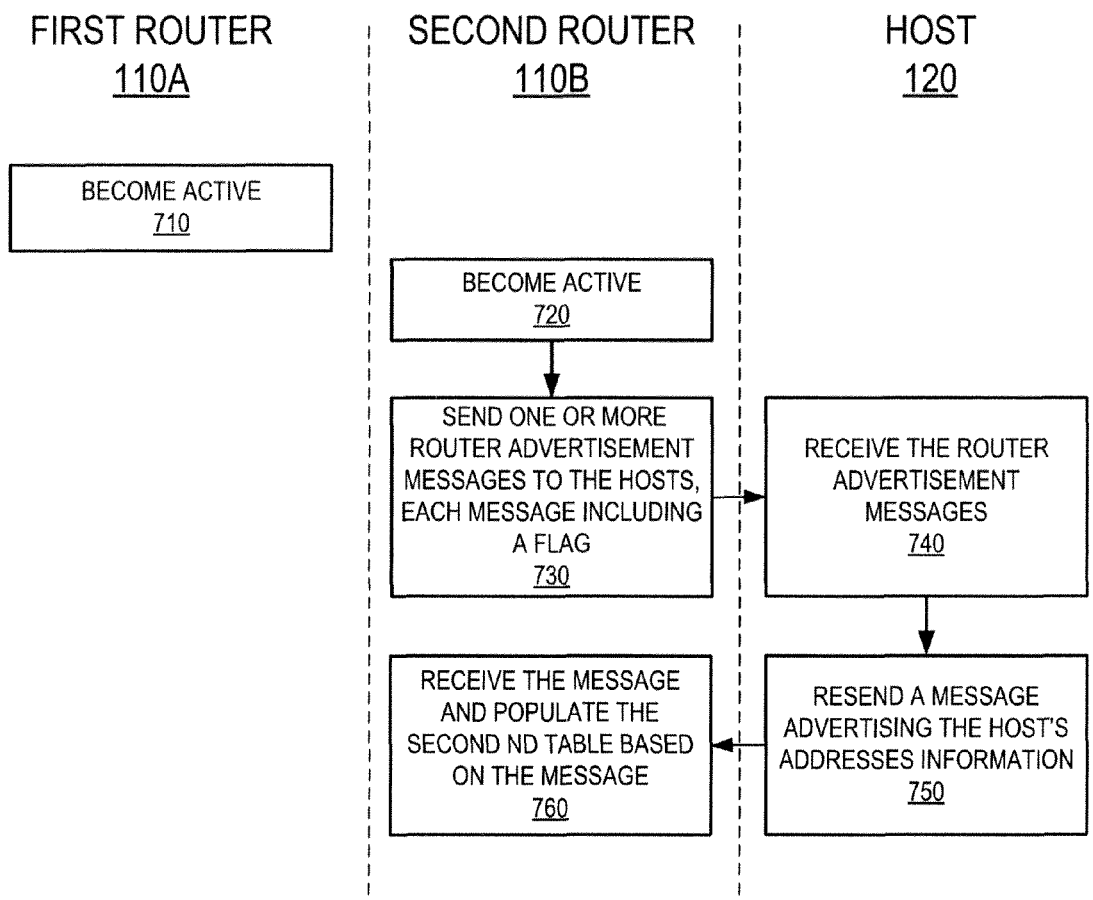
FIG. 7 is a diagram of a third embodiment of a message flow between the routers and the hosts on a subnet.

FIG. 7 is a diagram of a third embodiment of a message flow between the first router 110A, the second router 110B, and the host 120, which enables the second router 110B to obtain information for populating its ND table. In one embodiment, the first router 110A becomes active (block 710) followed by the second router 110B becoming active (block 720). The second router 110B sends one or more router advertisement messages to the hosts 120 on the subnet 150, each message including a flag (block 730). Each host 120 receives the router advertisement messages (block 740). The host 120 then resends, or replies with, a message advertising the host's addresses information (e.g., IPv6 and MAC addresses) (block 750). The second router 110B receives the messages from the hosts 120 and populates its ND table based on the messages (block 760). Since one or more of the hosts 120 may miss the request, or the response may get lost, the second router 110B can send the router advertisement with the flag multiple times to improve reliability In yet another scenario where there are more than two routers providing connectivity to the subnet 150, further refinements can be made with respect to the first two embodiments so as not to cause excess duplicate transmissions on the subnet 150.

Thus, a method, system and apparatus for preventing denial of service attacks have been described. It is to be understood that the techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly) to edge network elements, which are coupled (e.g., through one or more core network elements to other edge network elements) to other end stations (e.g., server end stations).

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of preventing denial-of-service attacks on hosts attached to a subnet, the attacks initiated by a remote node over an external network, the method performed by a router which forwards packets between the external network and the subnet, the method comprising the steps of:
   receiving, by the router, a packet for forwarding to a destination address in an address space of the subnet according to an Internet Protocol version 6 (IPv6) protocol;
   looking up the destination address in a neighbor discovery (ND) table maintained by the router, wherein the ND table is populated by operations on the subnet that were completed prior to receipt of the packet, the ND table containing entries with each entry storing a mapping of an Internet Protocol (IP) address to a Media Access Control (MAC) address of one of the hosts that have been verified by the router to be active;
   forwarding the packet to the destination address in response to a determination that the destination address is stored in the ND table;
   discarding the packet in response to a determination that the destination address is not stored in the ND table;
   detecting that a given entry of the entries in the ND table, the given entry representing a given host of the hosts, has an elapsed lifetime that reaches a verification threshold, the verification threshold to occur prior to an expiration of the given entry;
   verifying whether the given host is active, in response to the elapsed lifetime reaching the verification threshold;
   extending a lifetime of the given entry in the ND table in response to a determination that the given host is active;
   checking periodically whether the given entry has expired, in response to the elapsed lifetime reaching the verification threshold; and
   deleting the given entry from the ND table in response to a determination that the given host is not active and the given entry has expired.

2. The method of claim 1, wherein the step of verifying further comprises the steps of:
   sending a neighbor solicitation message to the given host; and
   extending the lifetime of the given entry in response to a reply to the ND solicitation message.

3. The method of claim 1, wherein the step of detecting further comprises the steps of:
   setting the verification threshold to be two-thirds of a lifetime threshold at which the given entry expires.

4. The method of claim 1, wherein the subnet includes a second router having a second ND table that has not been populated, the method further comprising the steps of:
   receiving, by the router, an advertisement from the second router indicating that the second router has become active; and
   sending, by the router, each of the hosts on the subnet a neighbor solicitation message with an unspecified source address in the message, which causes each of the hosts receiving the message to multicast a reply, thereby allowing the second router to populate the second ND table based on the reply.

5. The method of claim 1, wherein the subnet includes a second router having a second ND table that has not been populated, the method further comprising the steps of:
receiving, by the router, a request from the second router for data exchange upon activation of the second router; and
providing the ND table to the second router using a data exchange protocol.

6. The method of claim 1, wherein the subnet includes a second router having a second ND table that has not been populated, the method further comprising the steps of:
sending, by the second router, one or more router advertisement messages to the hosts on the subnet, each of the router advertisement messages including a flag, which is defined to prompt each of the hosts to resend a message advertising its addresses information; and
populating, by the second router, the second ND table based on the message from each of the hosts.

7. A network element for preventing denial-of-service attacks on hosts attached to a subnet, the attacks initiated by a remote node over an external network, the network element configured to forward packets between the external network and the subnet, the network element comprising:
a memory to store a neighbor discovery (ND) table, the ND table to contain entries and each entry to store a mapping of an Internet Protocol (IP) address to a Media Access Control (MAC) address of one of the hosts that have been verified by the network element to be active; and
a network processor communicatively coupled to the memory, the network processor configured to execute a destination determination module, a forwarding module, a timer module, and a verification module,
the destination determination module configured to look up a destination address of a packet received by the network element in the ND table populated by operations on the subnet that were completed prior to receipt of the packet, wherein the destination address is in an address space of the subnet according to an Internet Protocol version 6 (IPv6) protocol,
the forwarding module configured to forward the packet to the destination address if the destination address is stored in the ND table, and discard the packet if the destination address is not stored in the ND table,
the timer module configured to detect that a given entry of the entries in the ND table, the given entry representing a given host of the hosts, has an elapsed lifetime that reaches a verification threshold, the verification threshold to occur prior to an expiration of the given entry,
the verification module configured to verify whether the given host is active when a lifetime of the given entry reaches the verification threshold, and
the timer module further configured to extend the lifetime of the given entry in the ND table if the given host is active, to check periodically whether the given entry has expired, in response to the elapsed lifetime reaching the verification threshold, and to delete the given entry from the ND table upon a determination that the given host is not active and the given entry has expired.

8. The network element of claim 7, wherein the verification module is further configured to send a neighbor solicitation message to the given host to thereby verify whether the given host is active, and to extend the lifetime of the given entry in response to a reply to the ND solicitation message.

9. The network element of claim 7, wherein the verification threshold is two-thirds of a lifetime threshold at which the given entry expires.

10. The network element of claim 7, wherein the subnet includes a second network element having a second ND table that has not been populated, the network element further configured to
receive an advertisement message from the second network element wherein the advertisement message indicates that the second network element has become active, and
send each of the hosts on the subnet a neighbor solicitation message with an unspecified source address in the neighbor solicitation message, which is to cause each of the hosts that receives the neighbor solicitation message to multicast a reply, thereby allowing the second network element to populate the second ND table based on the reply.

11. The network element of claim 7, wherein the subnet includes a second network element having a second ND table that has not been populated, the network element further configured to receive a request from the second network element for data exchange upon activation of the second network element, and provide the ND table to the second network element using a data exchange protocol.

12. The network element of claim 7, wherein the subnet includes a second network element having a first ND table, and the network element is to become active after the second network element has become active, the network element further configured to execute a table populating module,
the table populating module configured to send an advertisement message to the second network element, wherein the advertisement message indicates that the network element has become active and causes the second network element to send each of the hosts on the subnet a neighbor solicitation message with an unspecified source address in the message,
the table populating module further configured to receive a reply multicast by each of the hosts that receives the neighbor solicitation message, and populate the ND table based on the reply.

13. The network element of claim 7, wherein the subnet includes a second network element having a second ND table, and the network element is to become active after the second network element has become active, the network element further configured to execute a table populating module,
the table populating module configured to send a request to the second network element for data exchange upon activation of the network element in accordance with a data exchange protocol, and
the table populating module further configured to receive the second ND table from the second network element and populate the ND table based on the second ND table.

14. The network element of claim 7, wherein the subnet includes a second network element having a second ND table, and the network element is to become active after the second network element has become active, the network element further configured to execute a table populating module,
the table populating module configured to send one or more router advertisement messages to the hosts on the subnet, each of the router advertisement messages including a flag, which is defined to prompt each of the hosts to resend a message advertising its addresses information, and
the table populating module further configured to populate the ND table based on the message from each of the hosts.

* * * * *

UNITED STATES PATENT AND TRADEMARK OFFICE
CERTIFICATE OF CORRECTION

| | | |
|---|---|---|
| PATENT NO. | : 9,246,939 B2 | Page 1 of 1 |
| APPLICATION NO. | : 13/165348 | |
| DATED | : January 26, 2016 | |
| INVENTOR(S) | : Halpern | |

It is certified that error appears in the above-identified patent and that said Letters Patent is hereby corrected as shown below:

On the Title page, in Item (56), under "OTHER PUBLICATIONS", in Column 2, Line 1, delete "P. P Mutaf" and insert -- P. Mutaf --, therefor.

In Column 2, Line 20, delete "preset" and insert -- present --, therefor.

In Column 4, Line 41, delete "subnet 120." and insert -- subnet 150. --, therefor.

In Column 4, Line 58, delete "time" and insert -- timer --, therefor.

In Column 6, Line 34, delete "anew" and insert -- a new --, therefor.

In Column 7, Line 7, delete "reliability" and insert -- reliability. --, therefor.

Signed and Sealed this
Seventeenth Day of May, 2016

Michelle K. Lee
*Director of the United States Patent and Trademark Office*